(12) United States Patent
Benetti (10) Patent No.: US 11,980,518 B2
(45) Date of Patent: May 14, 2024

(54) CLEANING APPLIANCE

(71) Applicant: Dyson Technology Limited, Wiltshire (GB)

(72) Inventor: Michele Benetti, Bristol (GB)

(73) Assignee: Dyson Technology Limited, Wiltshire (GB)

( * ) Notice: Subject to any disclaimer, the term of this patent is extended or adjusted under 35 U.S.C. 154(b) by 721 days.

(21) Appl. No.: 17/260,103

(22) PCT Filed: May 17, 2019

(86) PCT No.: PCT/GB2019/051365
§ 371 (c)(1),
(2) Date: Jan. 13, 2021

(87) PCT Pub. No.: WO2020/016544
PCT Pub. Date: Jan. 23, 2020

(65) Prior Publication Data
US 2021/0267733 A1  Sep. 2, 2021

(30) Foreign Application Priority Data
Jul. 16, 2018 (GB) ...................... 1811615

(51) Int. Cl.
*A61C 17/22* (2006.01)
*A46B 11/00* (2006.01)
(Continued)

(52) U.S. Cl.
CPC .......... *A61C 17/221* (2013.01); *A46B 11/001* (2013.01); *A61C 17/225* (2013.01);
(Continued)

(58) Field of Classification Search
CPC . A61C 17/221; A61C 17/227; A61C 17/3481; A61C 17/225; A61C 17/3409;
(Continued)

(56) References Cited

U.S. PATENT DOCUMENTS 3,424,156 A   1/1969   Smith
4,303,064 A   12/1981  Buffa
(Continued)

FOREIGN PATENT DOCUMENTS

CN   1309545 A    8/2001
CN   101193605 A  6/2008
(Continued)

OTHER PUBLICATIONS

Notification of Reasons for Refusal received for Japanese Patent Application No. 2021-501297, dated Feb. 8, 2022, 6 pages (3 pages of English Translation and 3 pages of Original Document).
(Continued)

*Primary Examiner* — David J Walczak
(74) *Attorney, Agent, or Firm* — Tucker Ellis LLP; Michael G. Craig; Heather M. Barnes (57) ABSTRACT

A dental treatment appliance includes a treatment system which transmits a pulsed signal towards the oral cavity and receives a signal returned from the oral cavity. A controller actuates the treatment of the oral cavity of the user depending on the received signal.

15 Claims, 9 Drawing Sheets

(51) Int. Cl.
    *A46B 13/02* (2006.01)
    *A46B 13/04* (2006.01)
    *A61C 17/34* (2006.01)

(52) U.S. Cl.
    CPC ........ *A61C 17/227* (2013.01); *A61C 17/3409* (2013.01); *A61C 17/3481* (2013.01); *A46B 13/02* (2013.01); *A46B 13/04* (2013.01)

(58) Field of Classification Search
    CPC ......... A61C 17/16; A61C 17/22; A61C 17/32; A61C 17/34; A46B 11/001; A46B 11/002; A46B 13/001; A46B 13/02; A46B 13/023; A46B 13/04
    USPC ........................ 401/270, 274, 275, 282, 288
    See application file for complete search history.

(56) References Cited

U.S. PATENT DOCUMENTS

| | | |
|---|---|---|
| 5,393,228 A | 2/1995 | Policicchio |
| 6,402,410 B1 | 6/2002 | Hall et al. |
| 6,574,820 B1 | 6/2003 | DePuydt et al. |
| 6,766,549 B2 | 7/2004 | Klupt |
| 6,902,337 B1 | 6/2005 | Kuo |
| 7,386,904 B2 | 6/2008 | Fattori |
| 7,469,440 B2 | 12/2008 | Boland et al. |
| 8,186,997 B2 * | 5/2012 | Binner ............... A61C 17/225 433/29 |
| 8,214,958 B2 * | 7/2012 | Pinyayev ............ A61B 5/0088 15/22.1 |
| 8,522,384 B2 | 9/2013 | Leung |
| 8,631,532 B2 | 1/2014 | Utsch et al. |
| 9,987,109 B2 | 6/2018 | Sokol et al. |
| 10,034,730 B2 | 7/2018 | Skaanland et al. |
| 10,034,731 B2 | 7/2018 | Chang et al. |
| 2001/0012605 A1 | 8/2001 | Kawamura |
| 2002/0152565 A1 | 10/2002 | Klupt |
| 2003/0101526 A1 | 6/2003 | Hilscher et al. |
| 2003/0135940 A1 | 7/2003 | Lev et al. |
| 2003/0205492 A1 | 11/2003 | Ferber et al. |
| 2004/0072122 A1 | 4/2004 | Hegemann |
| 2005/0271531 A1 | 12/2005 | Brown, Jr. et al. |
| 2005/0272001 A1 | 12/2005 | Blain et al. |
| 2006/0078844 A1 | 4/2006 | Goldman et al. |
| 2008/0060148 A1 | 3/2008 | Pinyayev et al. |
| 2009/0251687 A1 | 10/2009 | Duineveld et al. |
| 2010/0216090 A1 | 8/2010 | Kotlarchik et al. |
| 2010/0275394 A1 | 11/2010 | Kemp et al. |
| 2010/0278582 A1 | 11/2010 | Boland et al. |
| 2010/0284728 A1 | 11/2010 | Heil et al. |
| 2011/0000502 A1 | 1/2011 | Eubank |
| 2011/0091837 A1 | 4/2011 | Zolhayat |
| 2011/0143310 A1 | 6/2011 | Hunter |
| 2011/0232012 A1 | 9/2011 | Nanda |
| 2012/0160263 A1 | 6/2012 | Kotlarchik et al. |
| 2012/0189976 A1 | 7/2012 | McDonough et al. |
| 2012/0266393 A1 | 10/2012 | Wood et al. |
| 2012/0266396 A1 | 10/2012 | Leung |
| 2013/0080295 A1 | 3/2013 | Dykes et al. |
| 2013/0247321 A1 | 9/2013 | Sichau |
| 2014/0199651 A1 | 7/2014 | Adachi |
| 2015/0010882 A1 | 1/2015 | Bergheim et al. |
| 2015/0107034 A1 | 4/2015 | Shani et al. |
| 2015/0164612 A1 | 6/2015 | Kloster |
| 2015/0202030 A1 | 7/2015 | Miller |
| 2015/0230593 A1 | 8/2015 | Doll et al. |
| 2015/0257862 A1 | 9/2015 | Dishon |
| 2015/0297327 A1 | 10/2015 | Miller |
| 2015/0374454 A1 | 12/2015 | Beerstecher et al. |
| 2016/0015492 A1 | 1/2016 | Skaanland |
| 2016/0192769 A1 | 7/2016 | Bloch |
| 2016/0220013 A1 | 8/2016 | Barnes et al. |
| 2016/0310248 A1 | 10/2016 | Meerbeek et al. |
| 2016/0317267 A1 | 11/2016 | Meerbeek et al. |
| 2016/0331117 A1 | 11/2016 | Follows et al. |
| 2017/0116665 A1 | 4/2017 | Alzahrani |
| 2018/0125621 A1 | 5/2018 | Tweedie et al. |
| 2018/0125624 A1 | 5/2018 | Tweedie et al. |
| 2018/0168332 A1 | 6/2018 | Wagner et al. |
| 2018/0177489 A1 | 6/2018 | Yu et al. |
| 2018/0177575 A1 | 6/2018 | Yoshida et al. |
| 2018/0199819 A1 | 7/2018 | Yoshida et al. |
| 2018/0221124 A1 | 8/2018 | Carlyle et al. |
| 2018/0289458 A1 | 10/2018 | Follows et al. |
| 2019/0246905 A1 | 8/2019 | Belthangady et al. |
| 2023/0024733 A1 | 1/2023 | Benetti et al. |

FOREIGN PATENT DOCUMENTS

| | | |
|---|---|---|
| CN | 201200105 Y | 3/2009 |
| CN | 101534745 A | 9/2009 |
| CN | 102056568 A | 5/2011 |
| CN | 103188966 A | 7/2013 |
| CN | 103764063 A | 4/2014 |
| CN | 103815660 A | 5/2014 |
| CN | 204146571 U | 2/2015 |
| CN | 204744476 U | 11/2015 |
| CN | 105744911 A | 7/2016 |
| CN | 107690295 A | 2/2018 |
| CN | 107708606 A | 2/2018 |
| CN | 208926664 U | 6/2019 |
| DE | 19935067 A1 | 2/2001 |
| DE | 102005014095 A1 | 10/2006 |
| FR | 2789887 A1 | 8/2000 |
| GB | 2098468 A | 11/1982 |
| GB | 2538299 A | 11/2016 |
| GB | 2538308 A | 11/2016 |
| GB | 2538309 A | 11/2016 |
| GB | 2555620 A | 5/2018 |
| JP | S55-92312 U | 6/1980 |
| JP | S56-150435 U | 11/1981 |
| JP | S58-15855 A | 1/1983 |
| JP | H7-222757 A | 8/1995 |
| JP | H11-128252 A | 5/1999 |
| JP | 2001-513358 A | 9/2001 |
| JP | 2004-97776 A | 4/2004 |
| JP | 2008-501412 A | 1/2008 |
| JP | 2010-526638 A | 8/2010 |
| JP | 2013-226202 A | 11/2013 |
| JP | 2014-205144 A | 10/2014 |
| JP | 2015-186131 A | 10/2015 |
| JP | 2015-530145 A | 10/2015 |
| JP | 2016-501618 A | 1/2016 |
| JP | 2016-508811 A | 3/2016 |
| JP | 2016-058838 A | 4/2016 |
| JP | 2016-533804 A | 11/2016 |
| JP | 2016-539721 A | 12/2016 |
| JP | 2018-019730 A | 2/2018 |
| JP | 2018-069076 A | 5/2018 |
| RU | 2463016 C2 | 10/2012 |
| TW | 201200105 A | 1/2012 |
| WO | 99/07305 A1 | 2/1999 |
| WO | 99/59462 A1 | 11/1999 |
| WO | 02/11641 A2 | 2/2002 |
| WO | 2004/021958 A1 | 3/2004 |
| WO | 2005/076818 A2 | 8/2005 |
| WO | 2007/025244 A2 | 3/2007 |
| WO | 2008/147360 A1 | 12/2008 |
| WO | 2013/095462 A1 | 6/2013 |
| WO | 2014/033599 A1 | 3/2014 |
| WO | 2014/097022 A1 | 6/2014 |
| WO | 2014/140964 A1 | 9/2014 |
| WO | 2014/141031 A1 | 9/2014 |
| WO | 2015/087176 A1 | 6/2015 |
| WO | 2015/087219 A1 | 6/2015 |
| WO | 2016/185154 A1 | 11/2016 |
| WO | 2016/185162 A1 | 11/2016 |
| WO | 2016/201048 A1 | 12/2016 |
| WO | 2018/083443 A1 | 5/2018 |
| WO | 2018/083444 A1 | 5/2018 |
| WO | 2018/142099 A1 | 8/2018 |
| WO | 2019/072018 A1 | 4/2019 |
| WO | 2020/016546 A1 | 1/2020 |

(56) References Cited

FOREIGN PATENT DOCUMENTS

OTHER PUBLICATIONS

International Search Report and Written Opinion received for PCT Patent Application No. PCT/GB2020/052922, dated Jan. 26, 2021, 10 pages.
Carlyle et al., U.S. Office Action dated May 2, 2019, directed to U.S. Appl. No. 15/886,280; 7 pages.
Follows et al., U.S. Office Action dated Feb. 20, 2020, directed to U.S. Appl. No. 15/573,998; 13 pages.
Follows et al., U.S. Office Action dated Oct. 2, 2020, directed to U.S. Appl. No. 15/573,998; 11 pages.
International Search Report and Written Opinion dated Jul. 23, 2019, directed to International Application No. PCT/GB2019/051365; 12 pages.
Search Report dated Dec. 17, 2018, directed to GB Application No. 1811615.2; 1 page.
Tweedie et al., U.S. Office Action dated Feb. 18, 2021, directed to U.S. Appl. No. 15/802,898; 7 pages.
Tweedie et al., U.S. Office Action dated Feb. 25, 2019, directed to U.S. Appl. No. 15/802,898; 10 pages.
Tweedie et al., U.S. Office Action dated Jun. 12, 2020, directed to U.S. Appl. No. 15/802,898; 9 pages.
Tweedie et al., U.S. Office Action dated Jun. 28, 2019, directed to U.S. Appl. No. 15/802,898; 10 pages.
Tweedie et al., U.S. Office Action dated Sep. 1, 2020, directed to U.S. Appl. No. 15/802,884; 7 pages.
Tweedie et al., U.S. Office Action dated Nov. 18, 2019, directed to U.S. Appl. No. 15/802,898; 10 pages.
International Search Report and Written Opinion dated Jan. 27, 2016, directed to International Application No. PCT/GB2015/051642; 10 pages.
International Search Report and Written Opinion received for PCT Patent Application No. PCT/GB2017/053195, dated Jan. 15, 2018, 8 pages.
International Search Report and Written Opinion received for PCT Patent Application No. PCT/GB2017/053196, dated Jan. 25, 2018, 9 pages.
International Search Report and Written Opinion received for PCT Patent Application No. PCT/GB2018/050009, dated Mar. 13, 2018, 10 pages.
Search Report dated Apr. 19, 2017, directed to GB Application No. 1701805.2; 2 pages.
Search Report dated Apr. 19, 2017, directed to GB Application No. 1618632.2; 2 pages.
Search Report for GB Patent Application No. 2000804.1, dated Jul. 6, 2020, 1 page.
First Office Action and Search Report received for CN Application No. 201980047209.4, dated Aug. 19, 2021, 29 pages (17 pages of English Translation and 12 pages of Original Document).
First Office Action dated Dec. 17, 2019, directed to CN Application No. 201580081718.0; 12 pages.
International Search Report and Written Opinion received for PCT Patent Application No. PCT/GB2015/051642, dated Jan. 27, 2016, 9 pages.
International Search Report dated Jan. 15, 2018, directed to International Application No. PCT/GB2017/053195; 4 pages.
Notice of Reasons for Rejection dated Dec. 10, 2018, directed to JP Application No. 2017-212591; 13 pages.
Notice of Reasons for Rejection dated Sep. 14, 2018, directed to JP Application No. 2017-559536; 4 pages.
Official Action dated Aug. 13, 2018, directed to RU Application No. 2017143841; 11 pages.
Search Report dated Apr. 19, 2017, directed to GB Application No. 1618630.6; 2 pages.
Search Report dated Nov. 5, 2015, directed towards GB Application No. 1508371.0; 2 pages.
The First Office Action dated Dec. 27, 2019, directed to CN Application No. 201711078181.X; 21 pages.
Office Action received for Chinese Patent Application No. 202080093972.3, dated Feb. 16, 2023, 12 pages (6 pages of English Translation and 6 pages of Original Document).
Office Action received for Japanese Patent Application No. 2022-543777, dated Sep. 5, 2023, 6 pages (3 pages of English Translation and 3 pages of Original Document).

\* cited by examiner

CLEANING APPLIANCE

REFERENCE TO RELATED APPLICATIONS

This application is a national phase application under 35 USC 371 of International Application No. PCT/GB2019/051365, filed May 17, 2019, which claims the priority of United Kingdom Application No. 1811615.2, filed Jul. 16, 2018, the entire contents of each of which is incorporated herein by reference.

FIELD OF THE DISCLOSURE

The present invention relates to a treatment appliance. The treatment appliance is preferably a handheld treatment appliance, and is preferably a surface treating appliance. In preferred embodiments of the invention, the appliance is a dental treatment appliance. In a preferred embodiment, the appliance is an electric toothbrush having a fluid delivery system for delivering a fluid to the oral cavity of the user. This fluid may be toothpaste, or a fluid for improved interproximal cleaning. Alternatively, the appliance may not include any bristles or other elements for brushing teeth, and may be in the form of a dedicated oral treatment appliance.

BACKGROUND OF THE DISCLOSURE

Electric toothbrushes generally comprise a tool which is connected to a handle. The tool comprises a stem and a brush head bearing bristles for brushing teeth. The brush head comprises a static section which is connected to the stem, and at least one moveable section which is moveable relative to the static section, for example with one of a reciprocating, oscillating, vibrating, pivoting or rotating motion, to impart a brushing movement to bristles mounted thereon. The stem houses a drive shaft which couples with a transmission unit within the handle. The transmission unit is in turn connected to a motor, which is driven by a battery housed within the handle. The drive shaft and the transmission unit convert rotary or vibratory motion of the motor into the desired movement of the moveable section of the brush head relative to the static section of the brush head.

It is known to incorporate into an electric toothbrush a fluid delivery system for generating a burst of working fluid for interproximal cleaning. For example, WO2016/185154 describes a toothbrush having a handle, a brush head and a stem extending between the brush head and the handle. The brush head includes a nozzle from which working fluid is delivered to the oral cavity of the user, and a brush unit which moves relative to the nozzle to brush a user's teeth. The nozzle is moveable relative to the handle as the appliance is moved along the user's teeth. The toothbrush is operable in a selected one of two different modes. In a first mode, the user depresses a button to actuate the delivery of working fluid from the nozzle. In a second mode, a controller actuates the delivery of working fluid to the nozzle automatically depending on a signal received from a sensor. The sensor is located in the handle of the toothbrush. A pivoting arm located within the stem connects the nozzle to a magnet located adjacent to the sensor and which moves relative to the sensor as the nozzle moves relative to the handle, for example as the nozzle moves into, or out from, an interproximal gap in the user's teeth.

SUMMARY OF THE DISCLOSURE

In a first aspect the present invention provides a dental treatment appliance comprising a handle, a dental treatment system for delivering a treatment to the oral cavity of a user, the dental treatment system comprising detecting means for transmitting a signal towards the oral cavity and for receiving a signal returned from the oral cavity, and a controller for actuating the treatment of the oral cavity of the user, and moving means for moving the detecting means relative to the handle.

Unlike the appliance described in WO2016/185154, the treatment of the oral cavity of the user is actuated in dependence on a signal which is returned to the detecting means from the oral cavity. For example, where the detecting means is configured to transmit an acoustic signal to the oral cavity, the returned signal is an acoustic signal which is reflected back from the oral cavity. As another example, where the detecting means is configured to transmit an optical signal to the oral cavity, the returned signal may an optical signal which is reflected back from the oral cavity, or an optical signal which is emitted by the oral cavity. For example, depending on the wavelength of the transmitted signal, a signal may be returned to the detecting means due to fluorescence of plaque excited by the transmission signal. The wavelength and/or intensity of the returned signal can also be indicative of the transmission of the signal into an interproximal gap between adjacent teeth of the user. Depending on the returned signal, the controller actuates the treatment of the oral cavity, for example by the ejection of fluid into the interproximal region to remove matter located therein, or to remove plaque from the teeth of the user.

During a treatment of the oral cavity, the detecting means is moved relative to the handle. The detecting means may be moved along a path of any desired shape relative to the handle. For example, the detecting means may be moved along a curved path, such as an arcuate path or an S-shaped path, or a closed loop path, for example a circular path, relative to the handle. At a given position of the appliance relative to the oral cavity, this can enable the size of the region of the oral cavity upon which the transmitted signals are incident to be increased in comparison to an arrangement in which the detecting means is stationary relative to the handle. In a preferred embodiment, the moving means is arranged to move the detecting means reciprocally relative to the handle, preferably along a curved path, more preferably along an arcuate path. The moving means is preferably arranged to move the detecting means relative to the handle along a path which is arranged substantially perpendicular to a longitudinal axis of the handle. In a preferred embodiment, the detecting means is reciprocally swept about the longitudinal axis of the handle by an angle in the range from 10 to 30°, preferably at a frequency in the range from 200 to 300 Hz.

The appliance may be in the form of an appliance for treating an oral condition of the user. For example, the appliance may be in the form of a dedicated interproximal cleaning appliance for cleaning between the gaps in the user's teeth. The treatment system may comprise a fluid delivery system for delivering working fluid to the oral cavity of the user. Depending on the signal returned from the oral cavity, the controller actuates the delivery of working fluid to the oral cavity to dislodge matter located within a gap between the user's teeth. The movement of the detecting means relative to the handle can enable such a gap to be detected in advance of the fluid delivery system being located in an optimal position for delivering working fluid into the gap. This can enable the fluid delivery system to be "primed" by the controller, for example by drawing fluid from a fluid reservoir into a fluid chamber of a pump, once the gap has been detected so that fluid delivery system is ready to deliver working fluid into the gap once it is optimally positioned to do so. This can minimise the length of time that the fluid delivery system is held in a primed position in comparison, for example, to an arrangement in which the fluid delivery system is primed immediately after working fluid has been expelled from the fluid chamber of the pump, which could result in the fluid delivery system remaining in a primed position if no further gaps are detected before the appliance is switched off.

In this case, the moving means may be arranged to move the detecting means relative to a nozzle for delivering working fluid to the oral cavity. The nozzle preferably extends along a nozzle axis, which passes through a fluid outlet located at the tip of the nozzle. The nozzle axis may be aligned generally orthogonal to the longitudinal axis of the handle. The moving means may comprise a drive mechanism for driving the movement of the detecting means relative to the nozzle. The drive mechanism preferably comprises a transmission unit connected to the detecting means, and a drive unit for driving the transmission unit to move the detecting means relative to the nozzle. The drive unit is preferably located in the handle, and preferably comprises a motor. The transmission unit may comprise a drive shaft extending between the motor and the detecting means. The drive shaft may be housed within a stem which extends between the handle and the detecting means. The stem may form part of a cleaning tool which is detachably connected to the handle. The nozzle may be mounted on the stem so that the detecting means moves relative to the nozzle.

Alternatively, the appliance may be in the form of a toothbrush which has the additional function of improved interproximal cleaning through the emission of working fluid into the interproximal gap. Where the appliance is in the form of a toothbrush, the cleaning tool, or stem, preferably comprises a plurality of bristles. The bristles are preferably arranged around the nozzle, and may be arranged circumferentially about the nozzle. A plurality of bristles may be attached to a static section of the cleaning tool, which section is not moveable relative to the handle. Alternatively, or additionally, a plurality of bristles may be attached to a moveable section of the cleaning tool, which section is moveable relative to the handle.

In a preferred embodiment, the appliance comprises a brush unit comprising a bristle carrier and a plurality of bristles mounted on the bristle carrier, with the bristle carrier being moveable relative to the handle. The bristle carrier is preferably mounted on the stem of the cleaning tool. The appliance comprises a drive mechanism for driving the movement of the bristle carrier relative to the handle. The drive mechanism preferably comprises a transmission unit connected to the bristle carrier, and a drive unit for driving the transmission unit to move the bristle carrier relative to the handle. The drive unit is preferably located in the handle.

The drive mechanism is preferably arranged to drive the movement of the detecting means relative to the handle. The detecting means is preferably arranged to move with the bristle carrier relative to the handle. The detecting means may be arranged to move relative to the handle with the same movement pattern as, or with a different movement pattern from, the bristle carrier. For example, both the detecting means and the bristle carrier may be arranged to move reciprocally in a sweeping movement relative to the handle. The detecting means may be spaced from the bristle carrier, or mounted on the bristle carrier. For example, the drive mechanism may be arranged to move the stem relative to the handle so as to move both the brush unit and the detecting means simultaneously relative to the handle.

The nozzle is preferably arranged to move with the detecting means relative to the handle. For example, both the detecting means and the nozzle may be mounted on the bristle carrier so that the drive mechanism moves the bristle carrier, the nozzle and the detecting means simultaneously relative to the handle.

The detecting means may be arranged to transmit an optical signal or an audio signal towards the oral cavity. For example, the detecting means may comprise at least one acoustic transceiver or at least one optical transceiver. As another example, the detecting means may comprise one or more light transmitters, such as LEDs, for illuminating the oral cavity, and a camera for receiving light returned from the oral cavity and capturing an image of the oral cavity.

The detecting means is preferably arranged proximate to the nozzle so that region of the oral cavity towards which the signal is transmitted is substantially the same as the region which is subsequently treated by the treatment system. The detecting means and the nozzle may be positioned side by side on the cleaning tool. Alternatively, the detecting means may be arranged so as to extend at least partially about the nozzle axis. As another alternative, the detecting means may be arranged immediately behind the nozzle so that signals transmitted by, and returned to, the detecting means pass through the bore of the nozzle. As a further alternative, the detecting means may extend at least partially about the nozzle axis. For example, the detecting means may comprise a C-shaped, or horseshoe shaped, sensor or transceiver which extends partially about the nozzle axis. As another example, the detecting means may comprise a transceiver which surrounds the nozzle axis.

In a second aspect the present invention provides a dental treatment appliance comprising a fluid reservoir for storing a working fluid, and a fluid delivery system for receiving working fluid from the reservoir, the fluid delivery system comprising a nozzle for delivering working fluid to the oral cavity of a user, detecting means for transmitting a signal towards the oral cavity and for receiving a signal from the oral cavity, and a controller for actuating the delivery of working fluid depending on the received signal, wherein the detecting means surrounds the nozzle axis.

The moving means is preferably arranged to move the detecting means towards and away from at least one reference position. For example, where the detecting means is moved in a reciprocally sweeping movement along a curved path, a reference position may be located at the centre of that path. Alternatively, or additionally, reference positions may be located midway between the centre and the extremities of that path The controller is preferably configured to sample a signal received from the detecting means when the detecting means is in a said reference position, and to actuate the treatment of the oral cavity of the user depending on the sampled signal. As well as reducing signal processing by the controller, this can ensure that treatment of the oral cavity occurs when, for a nozzle moving with the detecting means, the nozzle is positioned optimally for that treatment. For example, where the reference position is located at the centre of the path along which the detecting means moves relative to the handle, the treatment of the oral cavity can take place as the nozzle is moving towards and/or away from its central position.

In a third aspect, the present invention provides a dental treatment appliance comprising a handle, a dental treatment system for delivering a treatment to the oral cavity of a user, the dental treatment system comprising detecting means for transmitting a signal towards the oral cavity and for receiving a signal returned from the oral cavity, and a controller for actuating the treatment of the oral cavity of the user, and moving means for moving the detecting means relative to the handle towards and away from at least one reference position, and wherein the controller is configured to sample a signal received from the detecting means when the detecting means is in a said reference position, and to actuate the treatment of the oral cavity of the user depending on the sampled signal.

The moving means is preferably arranged to oscillate the detecting means relative to the handle at an oscillation frequency F. Depending on the number and locations of reference positions along the movement path of the detecting means, the controller may be arranged to sample a signal returned from the oral cavity at the same frequency F, at a frequency nF, where n is an integer greater than 1, or at a frequency nF/m, where m is an integer, preferably equal to or less than 16. For example, m may take a value of 2, 4, 6, 8, 12 or 16.

The detecting means may be arranged to transmit a signal towards the oral cavity at the same frequency at which the controller is arranged to sample the signal returned from the oral cavity. This can be particularly beneficial where the detecting means comprises a camera; by pulsing, or strobing, the light signal which is transmitted towards the oral cavity, we have found that the sharpness of the image captured by the camera can be improved in comparison to a situation where the light signal is transmitted continuously to the oral cavity.

The transmission of a pulsed signal towards the optical cavity can be provided separately from the periodic sampling of the received signal by the controller, and so in a fourth aspect, the present invention provides a dental treatment appliance comprising a dental treatment system for delivering a treatment to the oral cavity of a user, the dental treatment system comprising detecting means for transmitting a pulsed signal towards the oral cavity and for receiving a signal returned from the oral cavity, and a controller for actuating the treatment of the oral cavity of the user depending on a signal received from the detecting means.

The appliance preferably comprises moving means for moving the detecting means relative to a handle of the appliance. The moving means is preferably arranged to oscillate the detecting means relative to the handle at an oscillation frequency F. The detecting means is preferably arranged to transmit a pulsed optical signal at a frequency nF, where n is an integer greater than 1, or at a frequency nF/m, where m is an integer which is preferably equal to or less than 16. For example, m may take a value of 2, 4, 6, 8, 12 or 16.

The controller is preferably located in the handle of the appliance. Whilst signals may be transmitted wirelessly from the detecting means to the controller, it is preferred that signals are transmitted from the detecting means to the controller along a physical transmission path located within the appliance. Preferably, the transmission path extends along part of the drive mechanism. This can allow the number of components of the appliance to be minimised.

In a fifth aspect, the present invention provides a dental treatment appliance comprising a handle, a cleaning tool comprising a bristle carrier and a plurality of bristles mounted on the bristle carrier, a drive mechanism for driving movement of the bristle carrier relative to the handle, a dental treatment system for treating the oral cavity of a user, the dental treatment system comprising detecting means for transmitting a signal towards the oral cavity and for receiving a signal returned from the oral cavity, and a controller for actuating the treatment of the oral cavity depending on the received signal, wherein a transmission path for signals transmitted from the detecting means to the controller extends along part of the drive mechanism.

As mentioned above, the drive mechanism is preferably located in the handle, and preferably comprises a transmission unit connected to the bristle carrier, and a drive unit for driving the transmission unit to move the bristle carrier relative to the handle. The transmission unit is preferably in the form of a shaft which is moved relative to the handle by the motor. The frequency of the vibration of the shaft is preferably in the range from 200 to 300 Hz. The motor preferably extends about the shaft so that the shaft rotates or vibrates relative to the handle upon excitation of the motor. The stem of the cleaning tool is mounted on the shaft.

The transmission path preferably extends along the transmission unit, more preferably along an external surface of the shaft. For example, a conductive track for conveying signals towards the controller may be formed on the external surface of the shaft. The track is preferably connected to a handle contact for engaging a cleaning tool contact when the cleaning tool is attached to the handle. The handle contact is preferably an annular contact which extends about an end part of the shaft. The cleaning tool preferably comprises a recess for receiving this part of the shaft to connect the cleaning tool to the handle. The cleaning tool contact is preferably located within the recess, and preferably protrudes inwardly from an internal peripheral surface of the recess to engage the handle contact when the cleaning tool is attached to the handle. A wire, track or other conductive member extends between the cleaning tool contact and the detecting means to convey signals from the detecting means to the cleaning tool contact.

In addition to extending along part of the transmission unit, the transmission path preferably also extends along part of the drive unit. The drive unit preferably comprises means for engaging the shaft, and the engaging means is preferably arranged to convey signals towards the controller. The drive unit is preferably arranged to move, more preferably rotate, the shaft away from an equilibrium position to move the cleaning tool relative to the handle against the force of the engaging means. The engaging means is arranged to urge the shaft back towards its equilibrium position when the driving force of the drive unit is removed. The engaging means preferably comprises a spring member, and in a preferred embodiment comprises a torsion spring. A wire, track or other conductive member extends between the spring member and the controller to convey signals from the spring member to the controller.

As mentioned above, the dental treatment system preferably comprises a fluid delivery system for delivering a working fluid to the oral cavity of the user. The fluid delivery system preferably comprises a fluid reservoir and a pump, with the controller being arranged to actuate the pump to draw working fluid from the fluid reservoir and eject working fluid towards the nozzle. The controller is preferably arranged to actuate the pump to eject a burst of working fluid towards the nozzle. The volume of each burst of working fluid which is generated by the fluid delivery system is preferably less than 1 ml, more preferably less than 0.5 ml. In a preferred embodiment, the volume of the burst of working fluid generated by the fluid delivery system is in the range from 0.1 to 0.4 ml. The fluid delivery system is preferably configured to deliver a burst of working fluid to the nozzle at a static pressure in the range from 3 to 10 bar.

The transmission unit preferably defines part of the fluid delivery system. The shaft preferably comprises a bore which defines part of the fluid delivery system.

The appliance preferably comprises a user interface for enabling a user to select a mode of operation of the appliance before the commencement of a treatment process. In this embodiment, the user interface is located on the handle of the appliance, and preferably comprises at least one user operable switch or button. The user interface may comprise a display located on the handle for displaying information about a chosen operating mode. Alternatively, the appliance may be connected wirelessly to a remote device having a display for displaying that information. The remote device may be in the form of a dedicated display or a personal device. The remote device may also include a user interface, such as a touch sensitive display, for enabling a user to select an operating mode for the appliance.

In a preferred embodiment, the appliance has a first operating mode and a second operating mode. In the first operating mode, the oral cavity is not treated by the dental treatment system in response to signals received from the detecting means, and so the appliance may be used as a conventional electric toothbrush with the brush unit moving relative to the handle during a cleaning process. In the second operating mode, the oral cavity is treated by the dental treatment system in response to signals received from the detecting means and so the appliance may be used as an electric toothbrush having the additional functionality of interproximal cleaning or other oral treatment taking place automatically during a cleaning process. In the second operating mode, the brush unit is moved relative to the handle during the cleaning process; in an optional third operating mode the brush unit remains stationary during the cleaning process and so the appliance operates as a dedicated oral treatment appliance.

During a treatment process, the user interface is preferably operable by the user to switch temporarily from the currently selected operating mode to the other operating mode. This can allow the user to switch as required between operating modes, for example after the completion of a brushing stage of a cleaning process to enable, for example, interproximal cleaning to take place automatically during a treatment stage of a cleaning process. Switching between the operating modes can allow the user to temporarily suspend the treatment of the oral cavity during a cleaning process, or to temporarily initiate automatic treatment of the oral cavity during brushing.

In a sixth aspect the present invention provides a dental treatment appliance comprising a handle, a bristle carrier and a plurality of bristles mounted on the bristle carrier, a drive mechanism for driving movement of the bristle carrier relative to the handle, a dental treatment system for treating the oral cavity of a user, the dental treatment system comprising detecting means for transmitting a signal towards the oral cavity and for receiving a signal reflected from the oral cavity, and a controller for actuating the treatment of the oral cavity, and a user interface, wherein before a treatment process, the user interface is operable to place the appliance in a selected one of a first operating mode, during which the drive mechanism moves the bristle carrier relative to the handle, and a second operating mode, during which the controller actuates the treatment of the oral cavity depending on the received signal, and wherein, during a treatment process, the user interface is operable by the user to switch temporarily from the selected operating mode to the other operating mode.

The user interface preferably comprises a switch or button located on the handle. The switch or button may be slidable or depressible to switch between operating modes of the appliance. The switch or button may therefore have a first state, in which the appliance remains in the selected operating mode, and a second state in which the appliance is placed in the other operating mode by the controller. The switch or button is preferably biased towards the first state. The appliance is preferably placed in the other operating condition while the switch or button is maintained in its second state. For example, where the user interface comprises a button, the appliance is placed in the other operating mode whilst the button is depressed by the user. Once the button is released by the user, the appliance is returned to the selected operating mode. The switch or button is preferably positioned so as to be operable by the thumb of a hand which is gripping the handle.

The appliance may be placed in the other operating mode as soon as the switch or button is placed in its second state by the user. In a preferred embodiment though, the appliance is placed in the other operating mode if the switch or button is placed in its second state for a duration which is greater than a preset period of time. This preset period of time is preferably in the range from 0.5 to 2 seconds. The appliance may be configured to generate an audible or visual alert to the user once it has been placed in the other operating mode. The appliance may also be configured to generate an audible or visual alert to the user once it has returned to the selected operating mode.

In the event that the switch or button is placed in its second state for a duration which is shorter than the preset period of time, the controller is preferably arranged to actuate a single treatment of the oral cavity. Where the dental treatment system is configured to deliver a working fluid to the oral cavity, the controller may be arranged to actuate the delivery of a single burst of working fluid, or a single series of bursts of working fluid, to the oral cavity.

Features described above in connection with the first aspect of the invention are equally applicable to the second to sixth aspects of the invention, and vice versa.

BRIEF DESCRIPTION OF THE FIGURES

Preferred features of the invention will now be described, by way of example only, with reference to the accompanying drawings, in which.

DETAILED DESCRIPTION OF THE DISCLOSURE

Figure 1A:
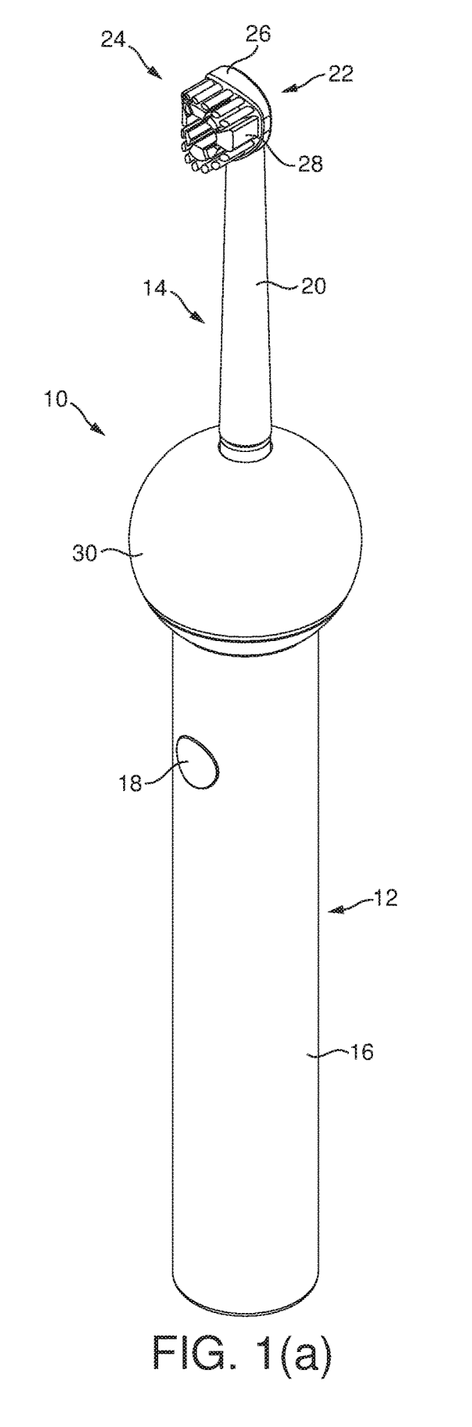
FIG. 1(a) is a perspective view, from the front, of a dental cleaning appliance.
Figure 1B:
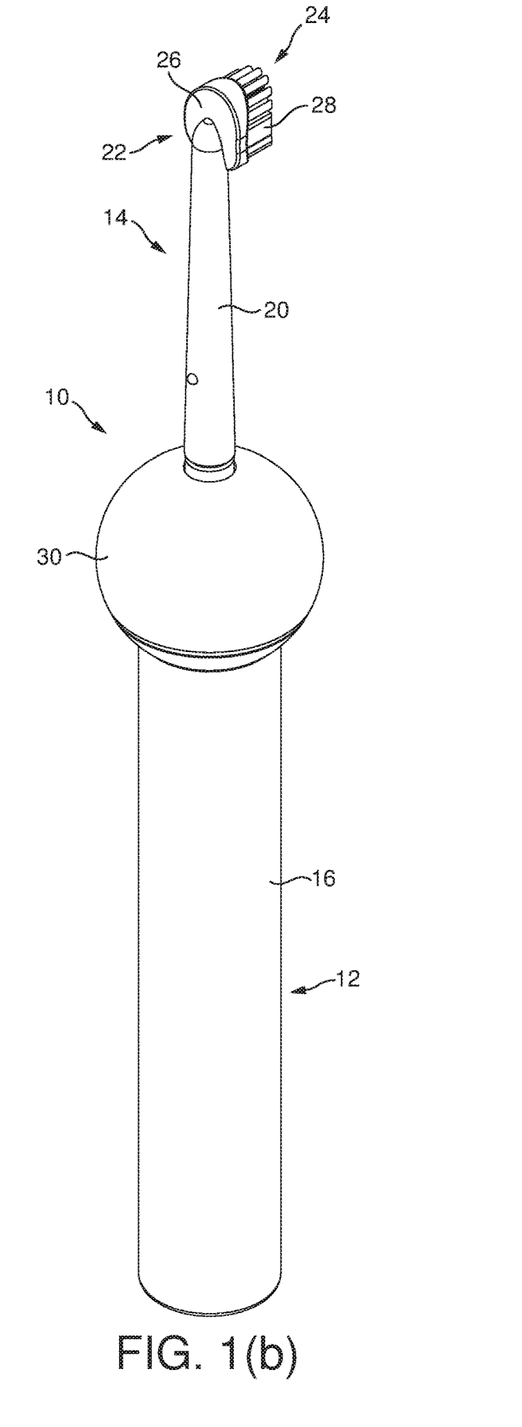
FIG. 1(b) is a perspective view, from the rear, of the appliance of FIG. 1(a)

FIGS. 1(a) and 1(b) illustrate external views of an embodiment of a dental cleaning appliance 10. In this embodiment, the appliance is in the form of a handheld appliance, which is in the form of an electric toothbrush having an integrated assembly for dispensing a working fluid for improved interproximal cleaning.

The appliance 10 comprises a handle 12 and a cleaning tool 14. The handle 12 comprises an external body 16 which is preferably formed from plastics material. The body 16 is generally cylindrical in shape. The handle 12 comprises a user interface. The user interface comprises a user operable button 18 which is located within an aperture formed in the body 16 so as to be depressible by the thumb of a hand which is gripping the body 16 of the handle 12. Optionally, the handle 12 may comprise a display which is positioned so as to be visible to a user during use of the appliance. The appliance 10 may be connectable to a remote display, such as a display of a personal device or mobile telephone, to enable the user to select operating modes or parameters for the appliance 10 using the button 18 and/or the remote display, as described in more detail below.

The cleaning tool 14 comprises a stem 20 and a head 22. The stem 20 is elongate in shape, which serves to space the head 22 from the handle 12 to facilitate user operability of the appliance 10. In this embodiment, the head 22 of the cleaning tool 14 comprises a brush unit 24, which comprises a bristle carrier 26 and a plurality of sets of bristles 28 mounted on the bristle carrier 26. In this embodiment, the brush unit 24 is rigidly connected to the stem 20. However, in other embodiments the cleaning tool 14 may be provided without a brush unit 24 so that the appliance is in the form of a dedicated oral treatment appliance, for example for cleaning between the gaps in the user's teeth, or for delivering a cleaning or whitening fluid to the teeth of the user.

Figure 2A:
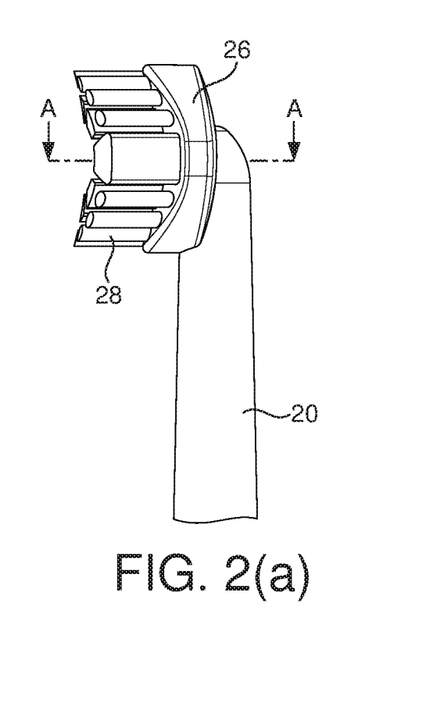
FIG. 2(a) is a side view of a brush unit of the appliance of FIG. 1(a)
Figure 2B:
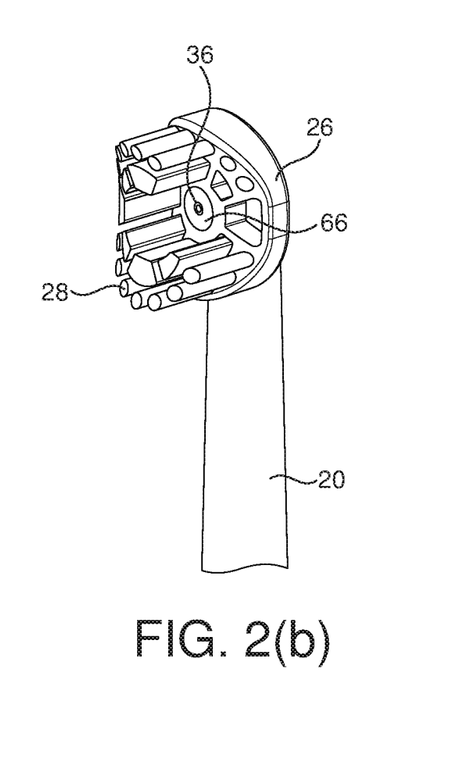
FIG. 2(b) is a perspective view of the brush unit with some of the bristles omitted to reveal a sensor and nozzle of the brush unit.
Figure 2C:
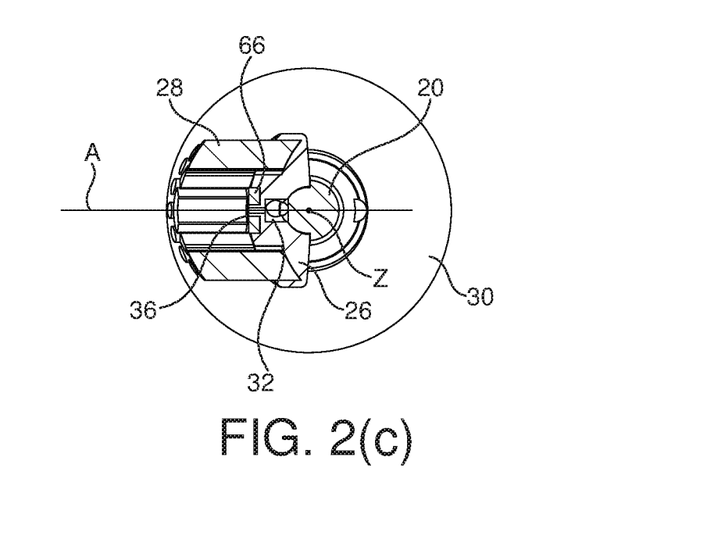
FIG. 2(c) is a sectional view taken along line A-A in FIG. 2(a)

With reference also to FIGS. 2(a) to 2(c), the cleaning tool 14 also comprises a fluid reservoir 30 for storing a working fluid, and a nozzle 32 for delivering working fluid to the oral cavity of the user during use of the appliance 10. The working fluid is preferably a liquid working fluid, and in this embodiment is water. The fluid reservoir 30 is mounted on the handle 12 so as to extend about an end of the handle 12. The nozzle 32 is mounted on the head 22 of the cleaning tool 14. In this embodiment which includes a brush unit 24, the bristles 28 are arranged at least partially around the nozzle 32. The nozzle 32 extends along a nozzle axis A, illustrated in FIG. 2(c), which is substantially perpendicular to a longitudinal axis Z of the handle 12.

The nozzle 32 forms part of a fluid delivery system 34 for receiving working fluid from the fluid reservoir 30 and for delivering bursts of working fluid to the oral cavity of a user during use of the appliance 10. Each burst of working fluid preferably has a volume which is less than 1 ml, more preferably less than 0.5 ml. The fluid delivery system 34 is illustrated schematically in FIG. 3. In overview, the tip of the nozzle 32 comprises a fluid outlet 36 through which a burst of working fluid is delivered to the oral cavity of the user. The fluid delivery system 34 comprises a fluid inlet 37 for receiving working fluid from the fluid reservoir 30. In this embodiment, the working fluid is a liquid working fluid, which is preferably water. The fluid inlet 37 is positioned on the handle 12, preferably on the end of the body 16 of the handle 12, and is arranged to connect to a fluid port of the fluid reservoir 30 when the fluid reservoir 30 is connected to the handle 12. As described below, the cleaning tool 14 is detachable from the handle 12, and the fluid reservoir 30 can be pulled away from the handle 12 for replenishment once the cleaning tool 14 has been detached from the handle 12.

Figure 3:
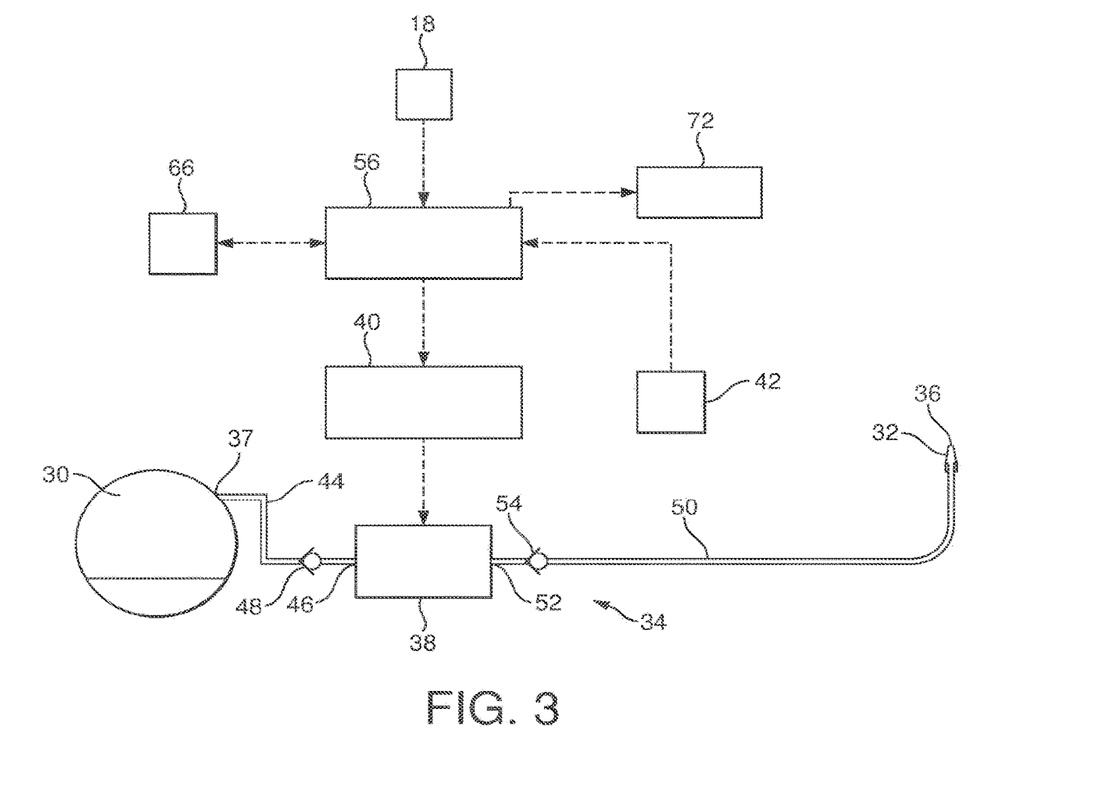
FIG. 3 is a schematic illustration of a fluid delivery system of the appliance.

The fluid delivery system 34 comprises a pump assembly for drawing working fluid from the fluid reservoir 30 through the fluid inlet 37, and for delivering a burst of working fluid to the nozzle 32. The pump assembly is located within the body 16 of the handle 12, and comprises a positive displacement pump 38 and a drive for driving the pump 38. The drive preferably comprises a pump motor 40. A battery 42 for supplying power to the pump motor 40 is also located in the handle 12. The battery 42 is preferably a rechargeable battery.

A first conduit 44 connects the fluid inlet 37 of the fluid delivery system 34 to a fluid inlet 46 of the pump 38. A first one-way valve 48 is located between the fluid inlet 37 and the pump 38 to prevent water from returning to the fluid reservoir 30 from the pump 38. A second conduit 50 connects a fluid outlet 52 of the pump 38 to the nozzle 32. A second one-way valve 54 is located between the pump 38 and the nozzle 32 to prevent water from returning to the pump 38. A control circuit 56 controls the actuation of the pump motor 40, and so the pump motor 40 and the control circuit 56 provide a drive for driving the pump 38. The battery 42 supplies power to the control circuit 56. The control circuit 56 includes a motor controller which supplies power to the pump motor 40.

The control circuit 56 receives signals generated when the user depresses the button 18 of the user interface. The control circuit 56 may transmit signals to, and receive signals from, a remote device, such as a display or a personal device. In this embodiment, the control circuit 56 also transmits signals to, and receives signals from, a sensor 66. With reference to FIGS. 2(b) and 2(c), the sensor 66 is mounted on the head 22 of the appliance 10, and preferably on the bristle carrier 26 of the brush unit 24. In this embodiment, the nozzle 32 is also mounted on the bristle carrier 26 of the brush unit 24. The sensor 66 is positioned on the head 22 so that it is located adjacent to the nozzle 32. In this embodiment, the sensor 66 is annular in shape, and is positioned so as to extend about, or surround, the nozzle axis A, preferably so as to surround at least part of the nozzle 32.

The sensor 66 is preferably in the form of an optical transceiver or, as in this embodiment, an acoustic transceiver which is driven by the control circuit 56. The sensor 66 is preferably a piezoelectric transceiver which is arranged to emit acoustic waves, preferably ultrasonic acoustic waves, from the head 22, and to receive acoustic waves which are returned to the sensor 66, for example, from the reflection of the acoustic waves by the oral cavity. The signals received by the sensor 66 are transmitted to the control circuit 56. In dependence on one or more parameters of the signal received from the sensor 66, such as the frequency and/or the amplitude or the signal, the control circuit 56 actuates the pump assembly to deliver one or more bursts of working fluid to the oral cavity. For example, the amplitude of the signal received by the sensor 66, or the variation with time of the amplitude of signals received by the sensor 66, can be indicative of the transmission of the acoustic signal into an interproximal gap between adjacent teeth of the user.

Figure 4A:
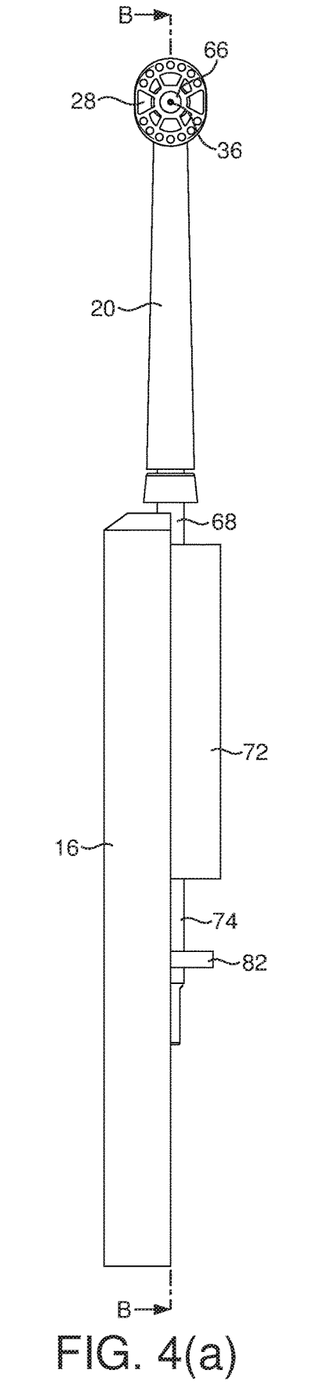
FIG. 4(a) is a front view of part of the appliance of FIG. 1(a), with the fluid reservoir and part of the handle removed.
Figure 4B:
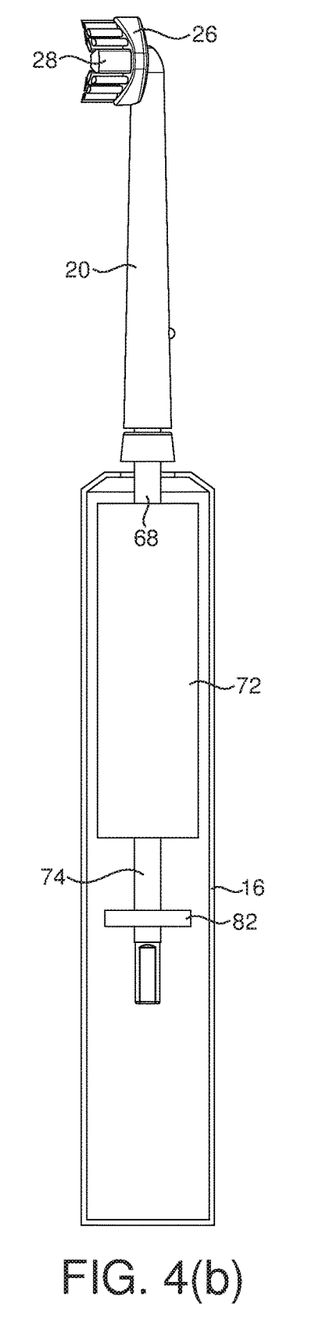
FIG. 4(b) is a side view of the part of the appliance of FIG. 4(a) and FIG. 4(c) is a perspective view, from above, of the part of the appliance of FIG. 4(a)
Figure 4C:
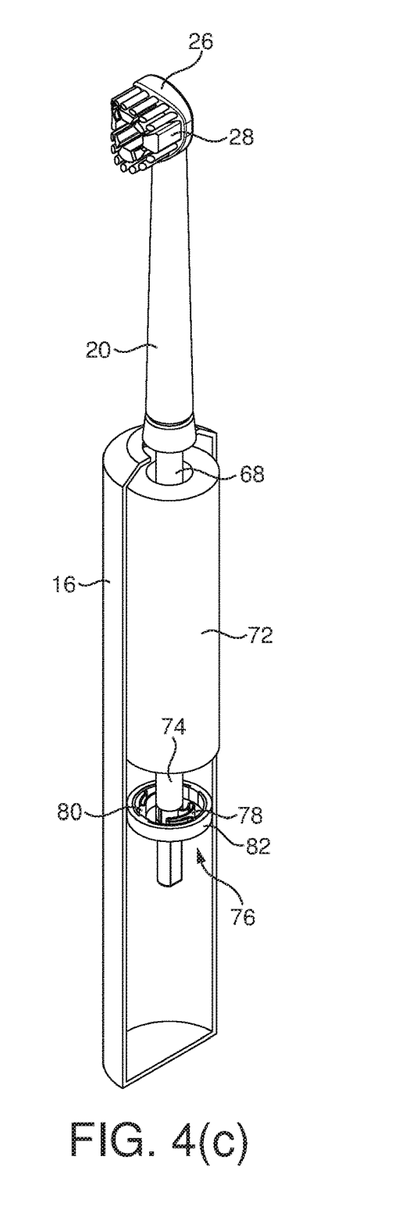
Figure 5:
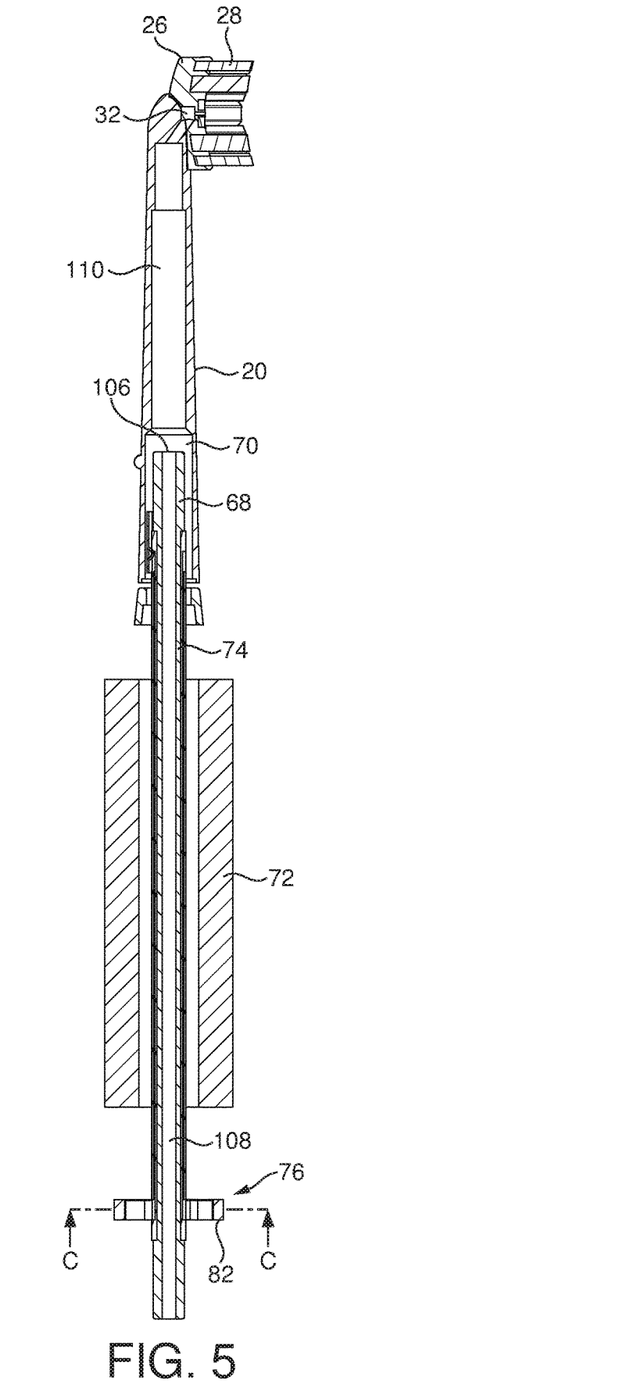
FIG. 5 is a sectional view taken along line B-B in FIG. 4(a)

The cleaning tool 14 is detachably connected to the handle 12. With reference also to FIGS. 4(*a*) to 6, the handle 12 comprises a male connector, preferably in the form of a spigot 68, which is received by a complementary female connector, preferably in the form of a recessed connector 70, of the stem 20 of the cleaning tool 14. The spigot 68 protrudes outwardly from the end of the handle 12, and preferably in a direction which is parallel to, and more preferably collinear with, a longitudinal axis Z of the handle 12.

The appliance 10 comprises a drive mechanism for driving the movement of the stem 20, and thus the bristle carrier 26, relative to the handle 12. With reference to FIGS. 4(*a*) to 7, the drive mechanism comprises a transmission unit and a drive unit for driving the transmission unit to move the stem 20 relative to the handle 12. The drive unit comprises a drive motor 72 which is located within the body 16 of the handle 12. The control circuit 56 includes a motor controller which supplies power to the drive motor 72. The button 18 may also be used to activate and deactivate the drive motor 72, for example by depressing the button 18 a predefined number of times within a preset time period, to start, and subsequently stop, a cleaning session. Alternatively, a separate button (not shown) may be provided for activating and deactivating the drive motor 72.

The transmission unit comprises a shaft 74 which is driven by the drive unit to oscillate relative to the handle 12. The spigot 68 is connected to, and is preferably integral with, the shaft 74. The drive unit is preferably arranged to oscillate the shaft 74 so that it oscillates about the longitudinal axis Z of the handle 12, preferably at a frequency in the range from 200 to 300 Hz. In this embodiment, the drive motor 72 is arranged to rotate the shaft 74 about the longitudinal axis away from a central position by an angle $\alpha$. The angle $\alpha$ is preferably in the range from 5 to 15°, and in this embodiment is 10°. The drive unit further comprises a spring member 76 for engaging the drive shaft 74 to return the shaft 74 to its central position. The spring member 76 comprises a pair of torsion springs 78, 80 located on opposite sides of the drive shaft 74, and each having a first end which engages the drive shaft 74 and a second end which is attached to a support ring 82 which is connected to, or otherwise held in a fixed position relative to, the handle 12.

With reference to FIGS. 8(*a*) to 8(*c*), this movement of the shaft 74 relative to the handle 12 causes the bristle carrier 26, and thus the nozzle 32 and sensor 66 mounted on the bristle carrier 26, to move back and forth along a respective curved paths. In this embodiment, the nozzle 32 and sensor 66 are each moved about the longitudinal axis Z of the handle 12 between a first angular position, illustrated in FIG. 8(*a*), and a second angular position, illustrated in FIG. 8(*c*), which are each angularly spaced from a central reference position, illustrated in FIG. 8(*b*), by the angle $\alpha$.

Figure 6:
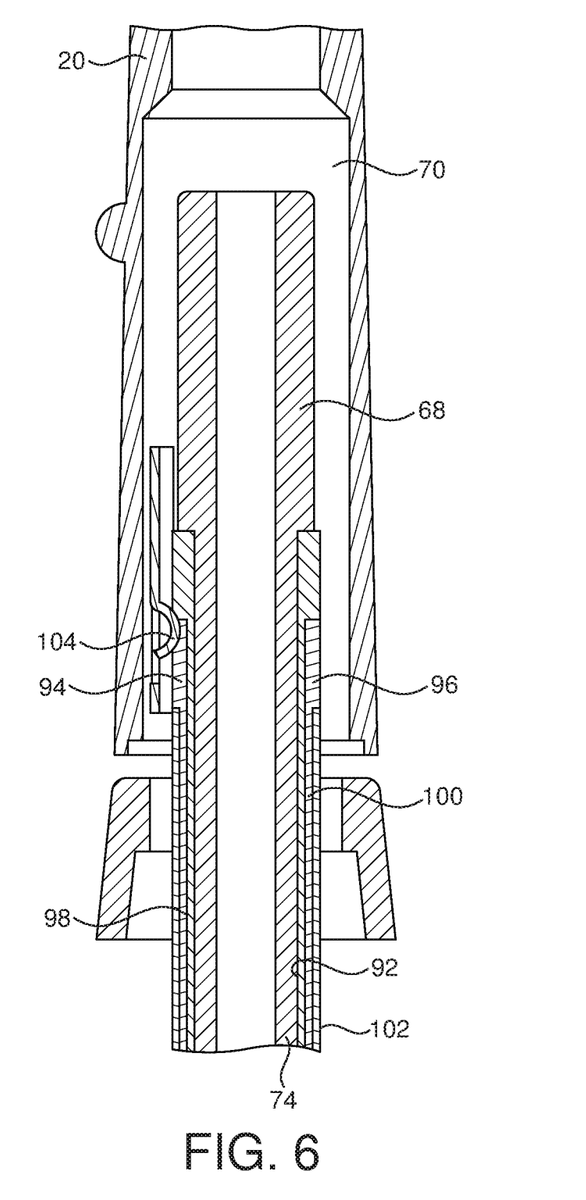
FIG. 6 is a close up of part of FIG. 5.
Figure 7:
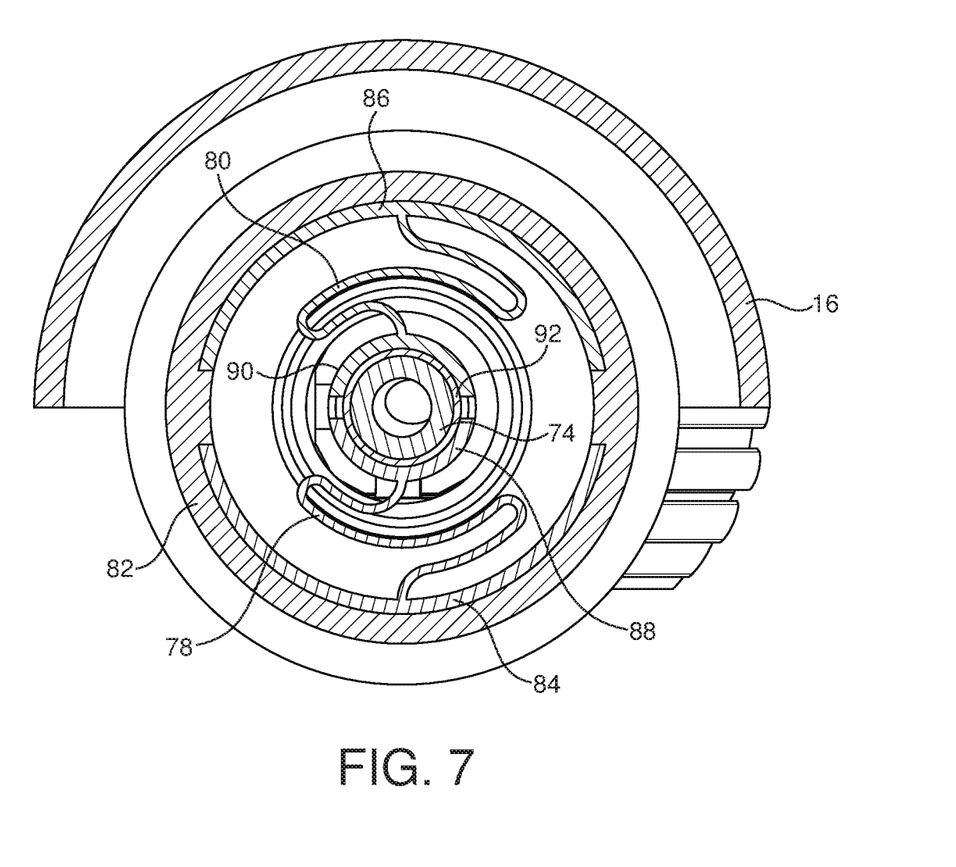
FIG. 7 is a sectional view taken along line C-C in FIG. 5.

During use of the appliance 10, drive signals are transmitted from the control circuit 56 to the sensor 66 to actuate the transmission of an acoustic wave from the sensor 66. Data signals, indicative of the acoustic wave subsequently returned to the sensor 66 by reflection from the oral cavity, are transmitted from the sensor 66 back to the control circuit 56, in dependence on which the control circuit 56 actuates the delivery of working fluid from the nozzle 32. The control circuit 56 is located in the body 16 of the handle 12, whilst the sensor 66 is located on the brush carrier 26 of the cleaning tool 14. In this embodiment, transmission paths for signals transmitted between the control circuit 56 and the sensor 66 extend along the drive unit. With reference to FIGS. 6 and 7, the second end of each torsion spring 78, 80 is connected to a respective circuit contact 84, 86 formed on the support ring 82. Wires (not shown) extend from each circuit contact 84, 86 to the control circuit 56. The first end of each torsion spring 78, 80 is connected to a respective shaft contact 88, 90 formed on the shaft 74. A first insulating sleeve 92 is located between the shaft 74 and the shaft contacts 88, 90 to electrically insulate the shaft contacts 88, 90 from the shaft 74. Each shaft contact 88, 90 is connected to a respective handle contact 94, 96 by a conductive track 98, 100 which extends along the first insulating sleeve 92. Each handle contact 94, 96 is located on the spigot 68. A second insulating sleeve 102 is located over the conductive tracks 98, 100 so that only the various different electrical contacts of the handle 12 are exposed along the transmission paths. The recessed connector 70 of the cleaning tool 14 includes a pair of cleaning tool contacts (one of which is indicated at 104 in FIG. 6) for engaging a respective handle contact 94, 96 when the cleaning tool 14 is attached to the handle 12. Each cleaning tool contact 104 protrudes inwardly from the internal peripheral surface of the recessed connector 70, and is connected by a respective wire to the sensor 66.

The second conduit 50, which connects the pump 38 to the nozzle 32, comprises a handle conduit section located within the handle 12, and a cleaning tool conduit section located within the cleaning tool 14. The handle conduit section extends from the fluid outlet 52 of the pump 38 to a handle fluid outlet 106 located at the end of the spigot 68. The handle conduit section comprises an outlet section 108 which is defined by the bore of the shaft 74. The cleaning tool conduit section comprises a conduit (not shown) which extends within the bore 110 of the stem 22 to the nozzle 32.

To operate the appliance 10, the user switches on the appliance 10 by depressing button 18, the action of which is detected by the control circuit 56. Before commencement of a treatment process using the appliance 10, the user can select, using the button 18, the remote display, or a combination of the button 18 and the remote display, an operating mode of the appliance 10. In this embodiment, the appliance 10 has a first operating mode and a second operating mode.

In the first operating mode, the drive mechanism moves the bristle carrier 26 relative to the handle 12. In this mode, the control circuit 56 does not drive the sensor 66 to transmit signals to the oral cavity, and so there is no automatic delivery of working fluid to the oral cavity of the user based on signals received from the sensor 66. During this first operating mode, the user may actuate the delivery of a single burst of working fluid from the nozzle 32 by depressing the button 18 for less than a preset period of time. This period of time is preferably in the range from 0.5 to 2 seconds, and in this embodiment is 1 second. In response to this depression of the button 18, the control circuit 56 activates the pump 38 to urge a volume of water from a fluid chamber of the pump 38 to the nozzle 32, and to replenish the fluid chamber through drawing a volume of water from the fluid reservoir 30.

Figure 8A:
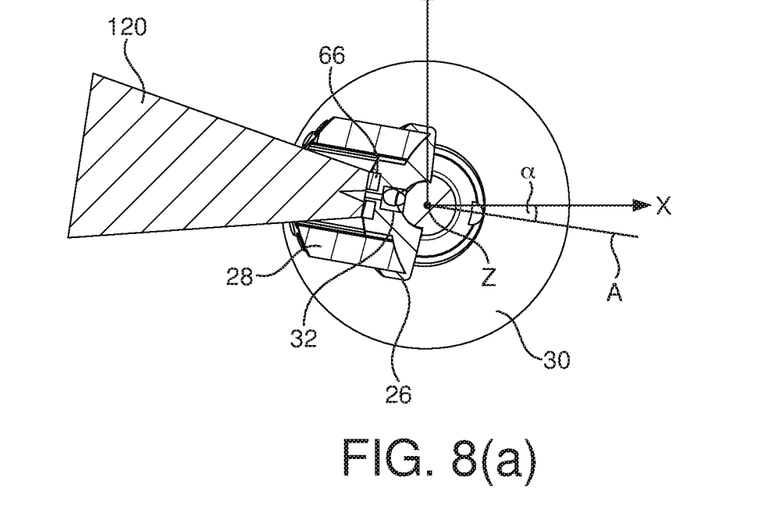
FIG. 8(a) is a similar view to FIG. 2(a) but illustrating the field of view of the sensor when at a first angular position relative to the handle.
Figure 8B:
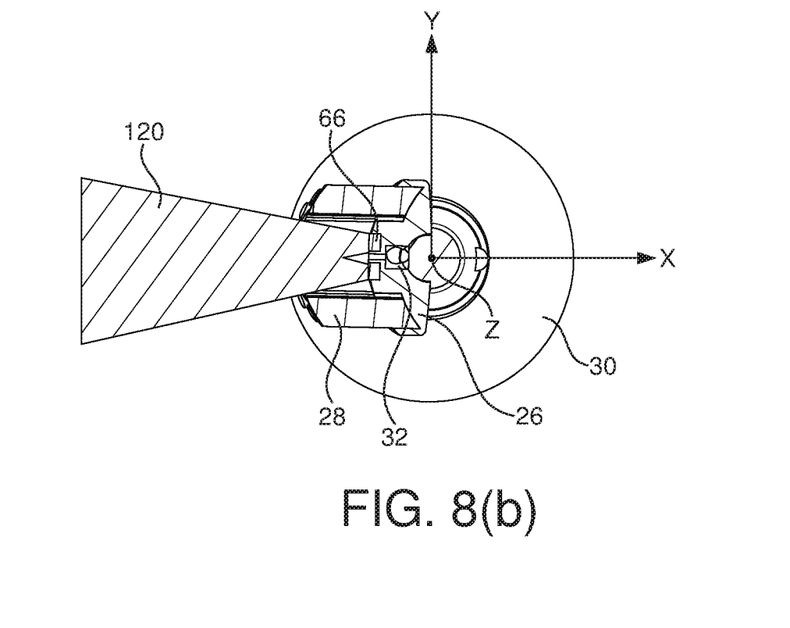
FIG. 8(b) is a similar view to FIG. 8(a) when the sensor is at a reference position relative to the handle.
Figure 8C:
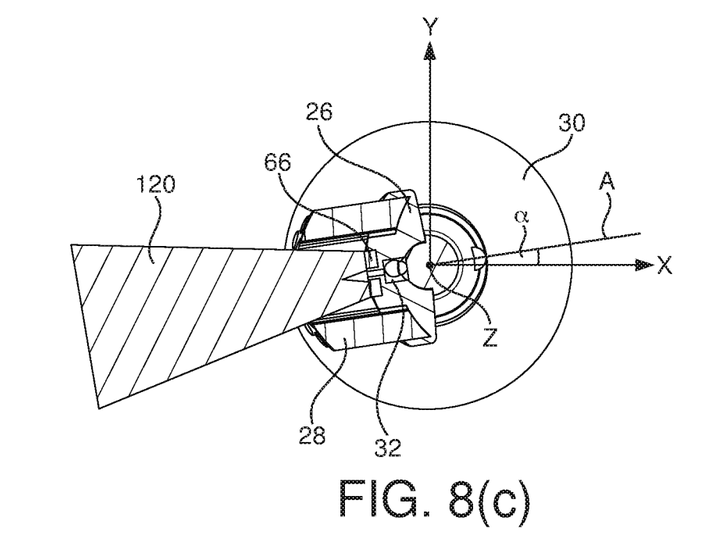
FIG. 8(c) is a similar view to FIG. 8(a) when the sensor is in a second angular position relative to the handle.

In the second operating mode, in addition to the functionality of the first operating mode the control circuit 56 actuates the sensor 66 to transmit acoustic signals away from the head 22 of the appliance 10, and so, in use, towards the oral cavity of the user. Signals reflected back from the oral cavity are detected by the sensor 66, and, in response to signals received from the sensor 66 which are indicative of the intensity of the received signals, the control circuit 56 is arranged to actuate the treatment of the oral cavity by the fluid treatment system 34 in the same manner as when the button 18 is depressed by the user during the first operating mode. As illustrated in FIGS. 8(a) to 8(c), as the bristle carrier 26 moves relative to the handle 12 during a treatment process the "field of view" 120 of the sensor 66 moves relative to the handle 12. Thus, during one "sweep" of the sensor 66 from the first angular position shown in FIG. 8(a) to the second angular position shown in FIG. 8(c), the field of view 120 is swept by an angle of 20° relative to the handle 12. Depending on the frequency with which the control circuit 56 is arranged to sample signals received from the sensor 66, the signals received from the sensor 66 can provide an indication of the cleaning tool 14 moving towards, or away from, an interproximal gap. The control circuit 56 can then time the actuation of the fluid delivery system 34 so that the burst of working fluid delivered by the fluid delivery system enters the interproximal gap to optimise the remove of debris or other matter from the gap.

In this embodiment, the control circuit 56 is arranged to sample, or process, signals received from the sensor 66 when the sensor 66 is located in a reference position relative to the handle 12. In this embodiment, the reference position is located midway between the first and second angular positions, and is illustrated in FIG. 8(b). The control circuit 56 thus samples a signal received from the sensor 66 once per "sweep" of the field of view 120 of the sensor 66 across the oral cavity. More generally though, where the sensor 66 is moved relative to the handle 12 at an oscillation frequency F, the control circuit 56 is preferably arranged to sample signals at a frequency of nF/16, where n is an integer greater than 1 and in this embodiment n=32. However, depending on the number of reference positions located along the path of the movement of the sensor 66 relative to the handle 12, and the frequency at which the control circuit 56 is arranged to sample signals when the sensor 66 is at a reference position, the value of n could be higher or lower than 32.

When the control circuit 56 is arranged to sample signals at a specific frequency, the control circuit may be further arranged to activate the sensor 66 to transmit signals towards the oral cavity with the same frequency with which signals are sampled by the control circuit 56. Where the sensor 66 is in the form of an optical transceiver, or a combination of an optical transmitter, such as an LED, and an optical receiver, such as a camera, this can results in the generation of a "strobing" effect as the appliance 10 is moved along the oral cavity. Through emitting a pulsed optical signal towards the oral cavity, and so having a pulsed optical signal returned to the camera from the oral cavity, the image of the oral cavity captured by the camera can be sharper than when an optical signal is transmitted continuously towards the oral cavity. The generation of a sharper image can be beneficial in improving the accuracy of the treatment of the oral cavity depending on the signal, or image, received by the control circuit 56.

Figure 8D:
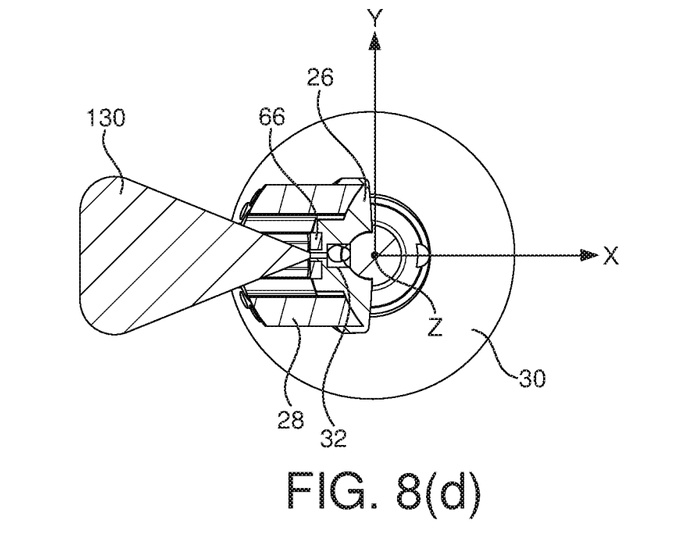
FIG. 8(d) is a similar view to FIG. 2(a) but illustrating the delivery of working fluid from the nozzle when the sensor is in the reference position.

The control circuit 56 may also be configured to actuate the treatment of the oral cavity when the sensor 66 is in a reference position, as illustrated in FIG. 8(d) in which a jet of water is indicated at 130.

During either of the two operating modes, the button 18 is operable by the user to switch temporarily from the currently selected operating mode to the other operating mode. In this embodiment, the control circuit 56 is arranged to temporarily switch, for example, from the first operating mode to the second operating mode when the button 18 is depressed for a duration which is longer than the preset period of time. Once the button 18 has been depressed for that period of time, the control circuit 56 operates the appliance 10 in the second operating mode until the button 18 is released by the user. Once the button 18 has been released, the control circuit 56 returns the operation of the appliance 10 back to the first operating mode. If, whilst the appliance 10 is in the second operating mode, the button 18 is depressed for a duration which is shorter than the preset period of time, the control circuit 56 actuates a single treatment of the oral cavity, as in the first operating mode.

The invention claimed is:

1. A dental treatment appliance comprising a dental treatment system for delivering a treatment to the oral cavity of a user, the dental treatment system comprising a detector for transmitting a pulsed signal towards the oral cavity and for receiving a signal returned from the oral cavity, a controller for actuating the treatment of the oral cavity of the user depending on a signal received from the detector, and a nozzle for delivering a working fluid to the oral cavity of the user, wherein the detector surrounds at least part of the nozzle.

2. The appliance of claim 1, comprising a handle, wherein the detector is movable relative to the handle.

3. The appliance of claim 2, wherein the detector is configured to move reciprocally relative to the handle.

4. The appliance of claim 3, wherein the detector is configured to move relative to the handle at a frequency in the range from 200 to 300 Hz.

5. The appliance of claim 2, wherein the detector is configured to oscillate relative to the handle at an oscillation frequency F, and the detector is configured to transmit optical signals at a frequency nF/16, where n is an integer greater than or equal to 1.

6. The appliance of claim 2, wherein the detector is configured to move relative to the handle along a path which is arranged perpendicular to a longitudinal axis of the handle.

7. The appliance of claim 2, wherein the detector is configured to move relative to the handle reciprocally along a curved path.

8. The appliance of claim 7, wherein the detector is swept about the longitudinal axis of the handle by an angle in the range from 10 to 30°.

9. The appliance of claim 2, comprising a drive for driving movement of the detector relative to the handle.

10. The appliance of claim 9, comprising a brush unit comprising a bristle carrier and a plurality of bristles mounted on the bristle carrier, and wherein the drive is configured to drive movement of the bristle carrier relative to the handle.

11. The appliance of claim 10, wherein the detector is configured to move with the bristle carrier relative to the handle.

12. The appliance of claim 10, wherein the detector is mounted on the bristle carrier.

13. The appliance of claim 10, comprising a stem extending between the handle and the brush unit, and wherein the drive is configured to move the stem relative to the handle.

14. A dental treatment appliance comprising a dental treatment system for delivering a treatment to the oral cavity of a user, the dental treatment system comprising a detector for transmitting a pulsed signal towards the oral cavity and for receiving a signal returned from the oral cavity, and a controller for actuating the treatment of the oral cavity of the user depending on a signal received from the detector, wherein the dental treatment system is configured to deliver a working fluid to the oral cavity of the user, wherein the dental treatment system comprises a nozzle for delivering working fluid to the oral cavity of the user, and wherein the nozzle is arranged to move with the detector relative to the handle.

15. A dental treatment appliance comprising a dental treatment system for delivering a treatment to the oral cavity of a user, the dental treatment system comprising a detector for transmitting a pulsed signal towards the oral cavity and for receiving a signal returned from the oral cavity, and a controller for actuating the treatment of the oral cavity of the user depending on a signal received from the detector, and wherein the detector is arranged to transmit the pulsed signal towards the oral cavity at the same frequency at which the controller is arranged to sample the signal returned from the oral cavity.

* * * * *